Sept. 6, 1960          J. V. GILIBERTY          2,951,660
METHOD AND MEANS FOR CONTROLLING THE JET THRUST OF AN AIRCRAFT
Filed June 25, 1956          3 Sheets-Sheet 2
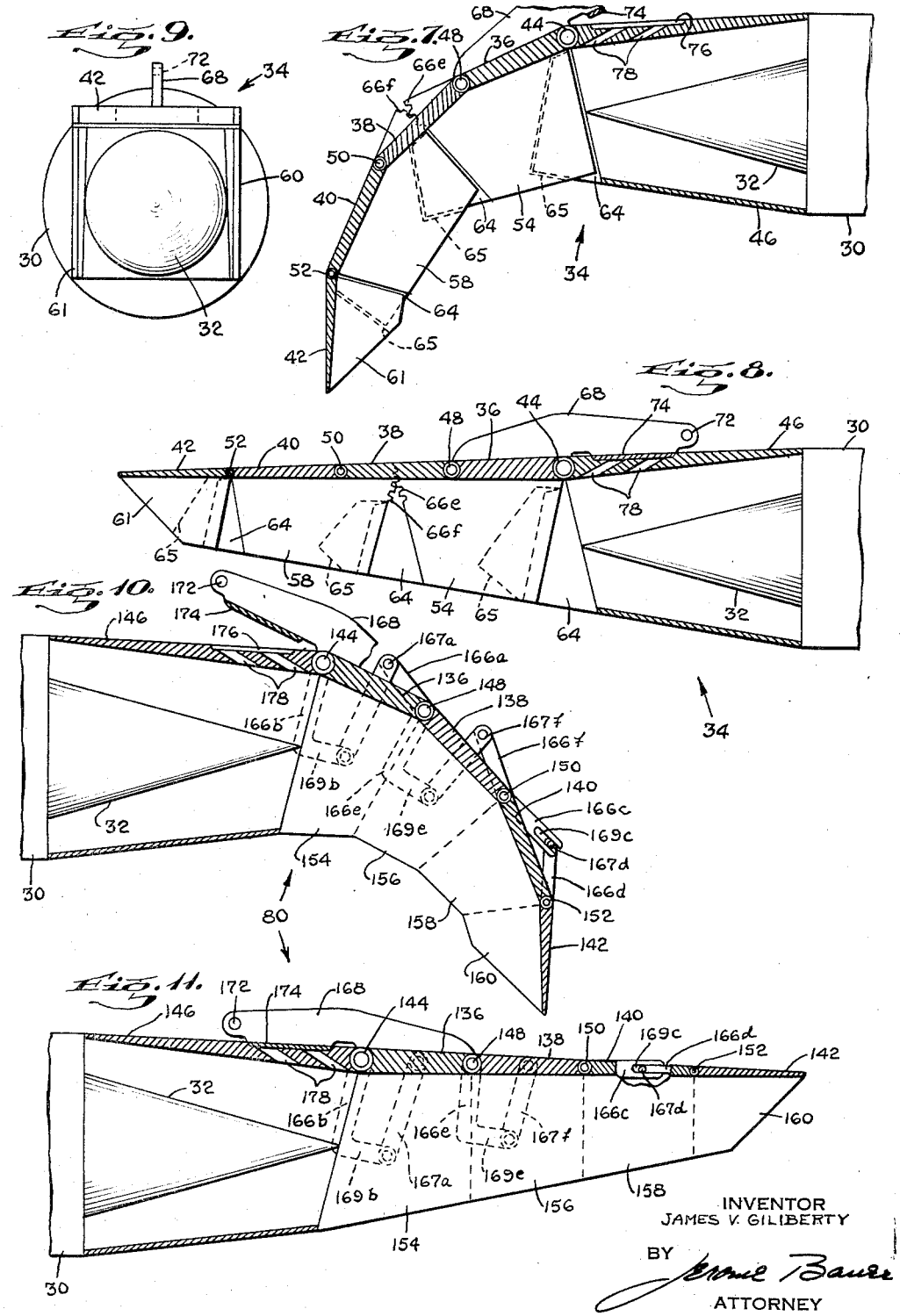
INVENTOR
JAMES V. GILIBERTY
BY
ATTORNEY

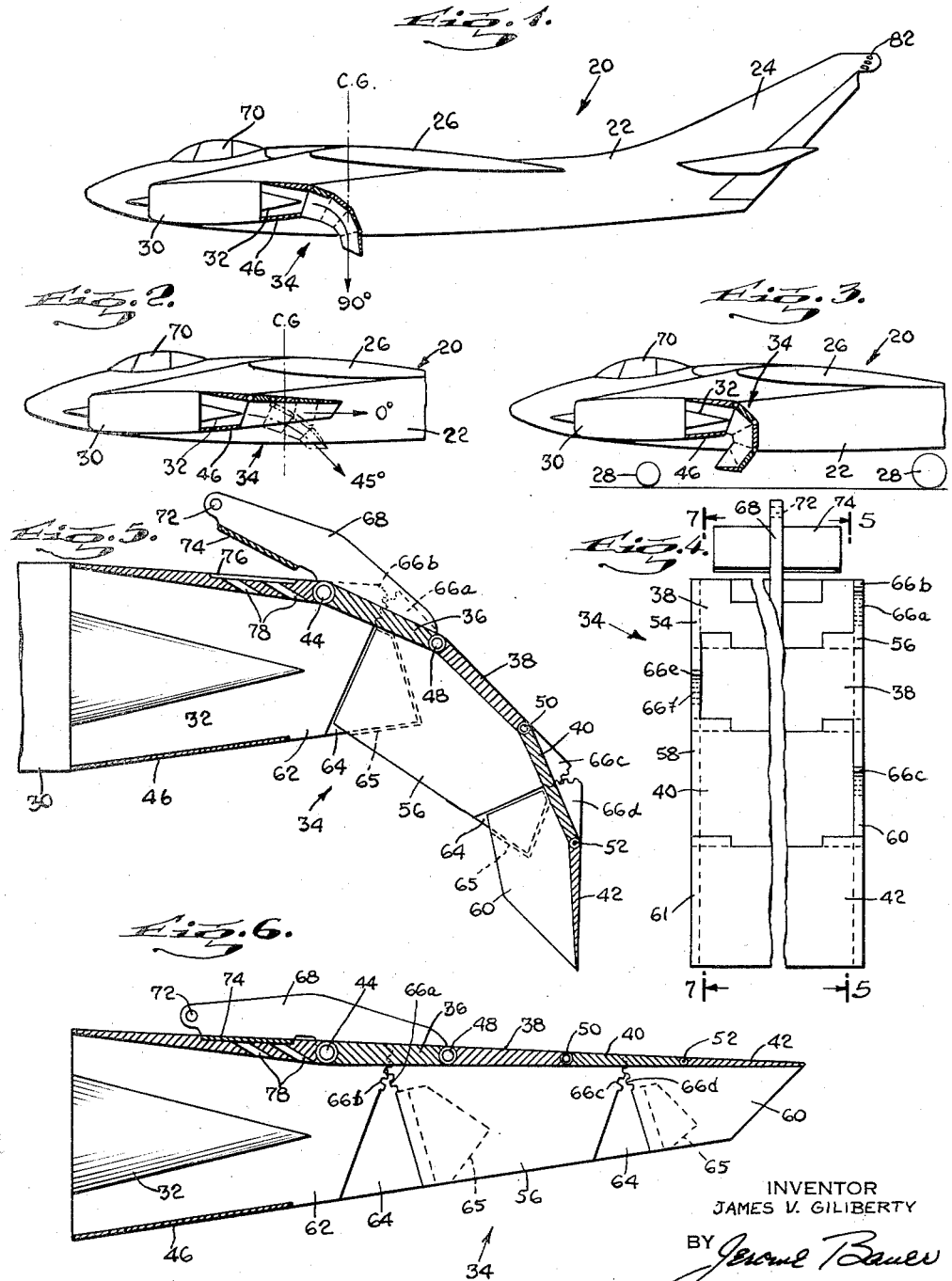

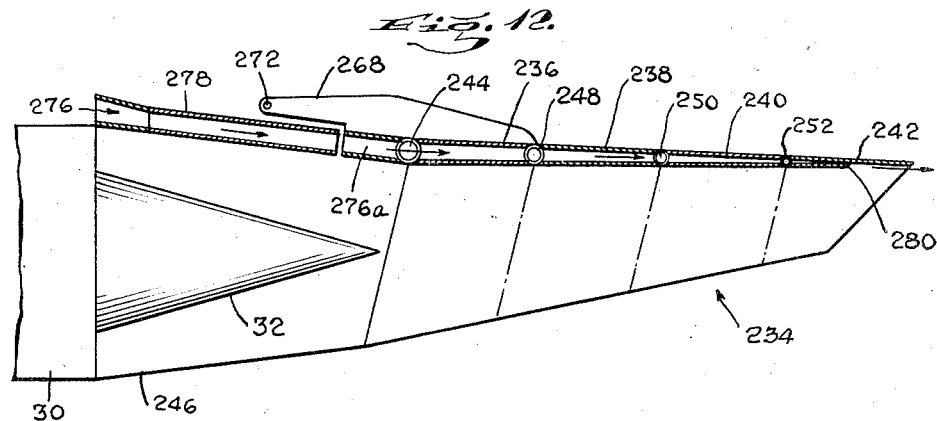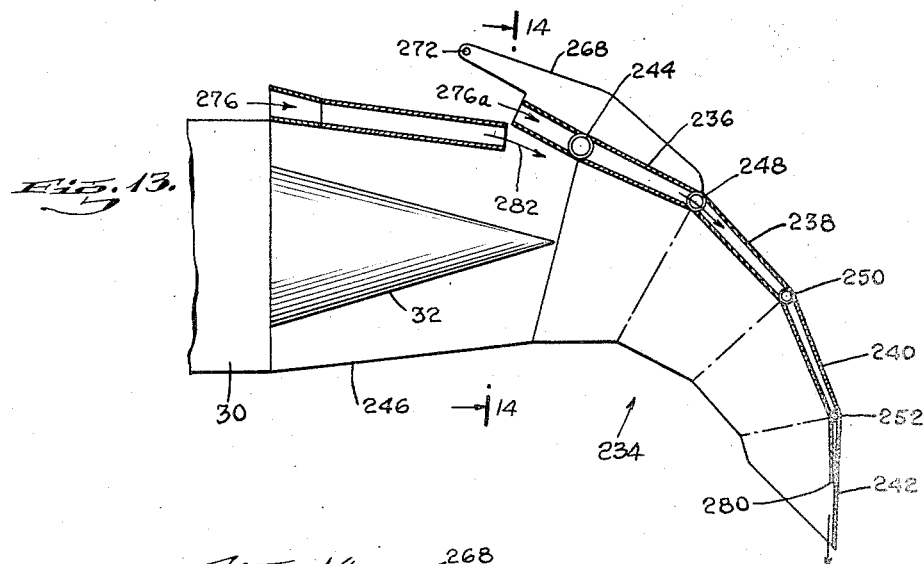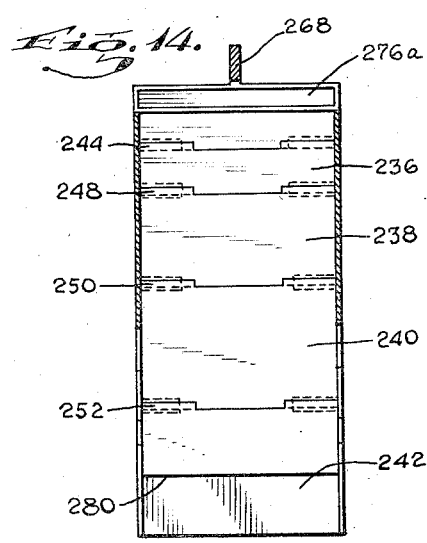

United States Patent Office 2,951,660
Patented Sept. 6, 1960

2,951,660

METHOD AND MEANS FOR CONTROLLING THE JET THRUST OF AN AIRCRAFT

James V. Giliberty, 114 Woodview Road, West Hempstead, N.Y.

Filed June 25, 1956, Ser. No. 593,567

26 Claims. (Cl. 244—23)

The invention relates to methods and means whereby the normal horizontal thrust of a jet of an aircraft may be more fully and completely utilized for the purpose of controlling and creating a greater lift on the aircraft than has been realized heretofore.

The desideratum of the invention is to facilitate selective control of the normally directed propulsive jet thrust of an aircraft to effect short field landings and take-offs, in some instances to permit the aircraft to operate substantially in a vertical direction without detriment to its high speed horizontal flight characteristics.

Therefore an object of the invention is to create a vertical component of lift directly from the normal horizontal propulsive thrust of a jet by such control of the same that the component of lift will be imparted to the aircraft independently of the lift that is normally created along its wings. A resulting feature of the invention is the combination of the independent lift created by controlling the jet of the aircraft with that normally occasioned along the wings so that the one lift may augment the other.

Another object of the invention is to provide structure for such intricate control of the normal horizontally directed propulsive jet thrust, that the forces thereof may be directed to create variable components of lift and thrust on the aircraft and whereby the component of lift is directed substantially in alignment with the plane of the center of gravity of the aircraft. In this regard, a feature of the invention resides in the novel structure that facilitates control and direction of the propulsive jet thrust from a normal angle of 0° to a deflected angle of 180° without interference with the free flow of the jet stream.

It is another object of the invention to provide a deflector of novel construction and operation wherein the operative parts thereof are segments each movable relatively to the other and being capable of finite adjustment between a flat smooth extension of the jet engine to form an angle of 0° therewith, to any infinite angle of deflection, and adjustable to form a curved deflector for the jet up to at least 180°.

Still another object of the invention is the provision of novel structure that permits the mixing of cool atmospheric gases or air with the hot jet gases to cool the jet stream and at the same time the deflector structure, to increase the density of the jet and thus provide a more favorable lift component.

Other and further objects of my invention reside in the structures and arrangements hereinafter more fully described with reference to the accompanying drawings in which:

Fig. 1 is a side view of an aircraft including a deflector constructed in accordance with the teaching of the invention and wherein the deflector is shown in its position to impart maximum lift.

Fig. 2 is a side view of a portion of the aircraft shown in Fig. 1, with the deflector in its normal extended position in full lines and in a partial vertical deflecting position in dot-dash lines.

Fig. 3 is a side view of a portion of the aircraft shown in Fig. 1 with the deflector in a reverse or 180° curved braking position.

Fig. 4 is an end view of the deflector shown in Fig. 1 in its position of maximum lift.

Fig. 5 is a sectional side view of the deflector shown in Fig. 4 taken along lines 5—5.

Fig. 6 is a sectional side view of the deflector taken along lines 5—5 of Fig. 4 but with the segments thereof in their extended position as shown in full lines in Fig. 2.

Fig. 7 is a sectional side view of the deflector taken along lines 7—7 of Fig. 4.

Fig. 8 is a sectional side view of the deflector taken along lines 7—7 of Fig. 4, but wherein the segments thereof are in their extended position as shown in full lines in Fig. 2.

Fig. 9 is an end view of the deflector when extended.

Fig. 10 is a sectional side view of a modified embodiment of the deflector as taught by the invention and with the same in its position of maximum lift.

Fig. 11 is a sectional side view of the deflector shown in Fig. 10 with the segments thereof in their extended position.

Fig. 12 is a sectional side view of a modified deflector shown in its normal extended position.

Fig. 13 is a sectional side view of the deflector shown in its position of maximum lift.

Fig. 14 is an end view of the deflector in Fig. 13 taken along lines 14—14.

Referring now to Figs. 1 to 9 inclusive and in particular to Figs. 1, 2 and 3, there is disclosed an aircraft generally identified by the numeral 20. The aircraft 20 may be of any suitable well known design having a fuselage 22 formed integrally with a tail section 24, wings 26 and landing gear 28 (Fig. 3). Supported in suspension from the wings 26 beneath it and forwardly of the plane of the center of gravity C.G. of the aircraft 20, are engines 30, only one of which is shown.

In the instant application and drawings, the engine 30 may be of any well known design of the type to produce a propulsive jet thrust to propel the aircraft 20, for example, a turbo-jet engine. The engine 30 is fixedly supported in relation to the remaining structure of the aircraft as to provide a normal horizontal component of thrust thereon and has a cone exhaust member 32.

Projecting from and normally co-extensive in alignment with the exhaust end of the engine 30 is a deflector structure generally identified by the numeral 34. In its normal extended condition the deflector 34 passes through the C.G. of the aircraft 20 and defines a continuation of the exhaust end of the engine so that the propulsive jet produced thereby may be deflected from its normal line of thrust through a controlled arc to control and vary the components of horizontal thrust and vertical lift that may be produced thereby on the aircraft.

The deflector structure 34 is composed of a plurality of relatively movable segments 36, 38, 40 and 42 which in their normal position are aligned with each other in succession. This successive line of segments 36 to 42 is secured at its forward end at a fixed pivot 44 to a fixed member 46. The fixed member 46, forming a part of the deflector structure 34, is secured to the exhaust end of the engine surrounding the cone 32.

Each of the segments 36 to 42 is successively pivoted to the next adjacent segment by the freely displaceable or unfixed pivots 48, 50 and 52 respectively. The free pivot 48 interconnects the first segment 36 in the line of segments to the second segment 38 for relative movement, and also relative displacement. The free pivot 50 serves to interconnect the second segment 38 with the segment 40, while the free pivot 52 interconnects the third segment 40 with the fourth segment 42. Each of the succeeding pivots 50 and 52 serve the same purpose for their respectively connected segments as the aforementioned pivot 48.

In its normal position the deflector 34, composed of the line of successive segments 36 to 42, normally extends from the exhaust end of the engine 30 at an angle of 0° in alignment therewith to leave unobstructed the forward thrust of the jet produced at the exhaust of the engine. The segments of the deflector cooperate with each other to define a substantially enclosed guideway for the jet having at least three guideway surfaces. The three-surfaced guideway shown comprises the tops of the segments and at least one side that extends downwardly from each segment.

In the embodiment shown in the drawings, the first segment 36 may have at least one side 54 (Figs. 4, 7 and 8) projecting down therefrom. The second segment 48 may have at least one side 56 (Figs. 4, 5 and 6). The third segment 40 may have at least the side 58 (Figs. 4, 7 and 8), while the fourth segment 42, being the last in line, may have at least the side 60 (Figs. 4, 5 and 6) and side 61 (Figs. 4, 7 and 8) laterally spaced from each other. The sides 54 through 60 and 61 each extend downwardly from the tops of their respective segments. The tops of the segments thus define at least one surface of the guideway, while their sides define the other two surfaces (see Fig. 9) along which the jet may be guided, deflected, and its exhaust angle controlled.

In order to adequately describe the inventive features of the deflector 34, the drawings disclose the minimum details. However, as the description proceeds, it will be recognized by those who are skilled in the art that these details of the sides of the segments and the actuator means (to be described) may be compounded and multiplied to suit the situation. However, in the drawings, the sides shown are elongated in length so that they extend generally for a distance that is greater than the length of their respective segments. Each of the sides and the end 62 of the fixed member 46 are recessed as at 64, for interfitting cooperation to accommodate overlying portions of the next adjacent sides whereby, when the respective segments of the deflector are actuated to form a curved guideway through which the jet is deflected, the recessed portions will move one within and relative to the other to form substantially smooth, uninterrupted side surfaces (see Figs. 5 and 7).

In order to cause the sides and their respective segments to move and to be displaced one relatively to each other, there is provided actuating means in the form of an intermeshing gear system. The actuating means are positioned between the segments on the downwardly extending sides thereof and serve to operatively interconnect alternate ones of the segments, and also the second segment 38 with the fixed member 46.

Hence, elongated side 56 is formed with an actuator spur gear 66a that interconnects its respective segment 38 with the fixed member 46 having a fixed meshing spur gear 66b. At its opposite end, side 56 has an actuator spur gear 66c that cooperates with spur gear 66d defined on the elongated side 60 of the fourth segment 42 which is once removed or alternately located with respect to segment 38. The first segment 36 has defined on its elongated side 54, a spur gear actuator 66e that meshes with and interconnects with an actuator spur gear 66f defined on the elongated side 58 of the third segment 40 that is alternately positioned or once removed from the segment 36.

It will be recognized that the actuating means or spur gears interconnect alternate ones of the segments for relative movement and displacement from their normal position of alignment, with each of the segments and their respective pivots being movable relatively to and out of alignment with the fixed pivot 44 to which the forward end of the line of segments is connected. Precise and predetermined selected infinite control of the movement and displacement of the segments from their normal position of 0° alignment with the jet thrust produced by the engine, up to and including at least an arc of 180°, may be accomplished by a control means or lever 68.

The control lever 68 may be connected in any suitable manner to at least one of the segments of the aforementioned line of segments. In the embodiment here disclosed, the control lever 68 is made integral with the top of the first segment 36 and is caused to pivot about the fixed pivot 44 by any well known mechanism suitably operated by the pilot from the cockpit 70 of the aircraft. Such operating mechanism may take the form of a hydraulic or mechanical or electrical operator, and since the same does not form any part of the invention, its details are not disclosed. However, the operating mechanism to be employed may be connected for operation of the control lever 68 at the forward end 72 thereof.

The control lever 68 has mounted on its under surface a vent cover 74 which is normally positioned within a seat 76. The vent cover 74, being secured to the underside of the lever 68, moves therewith relative to its seat 76 when the lever is actuated. When the line of segments of the deflector 34 are in alignment with the normal horizontal thrust of the jet, vent cover 74 is positioned in its seat 76 and atmospheric ports or vents 78 are covered and closed thereby. The seat 76 and the vents 78 are defined in the fixed member 46. When the control means 68 is lifted about the point 44, the vent cover 74 is lifted from its seat 76 to expose the vents 78 to the surrounding atmosphere, permitting the entry of air into the deflector guideway.

The engine 30 is normally positioned forward of the vertical plane of the center of gravity of the aircraft. Hence, the deflector 34 projecting or extending beyond the exhaust end of the engine 30, normally passes through the plane of the center of gravity of the aircraft. It will be seen that when the deflector 34 is actuated from its normal position of alignment with the normal horizontal forward thrust of the jet, it is displaced to control the movement of the jet through the plane of the center of gravity to create a vertical component of thrust or lift that is substantially aligned with the C.G. of the aircraft.

In operation, depending upon the predetermined selective ratio of lift and horizontal thrust that the pilot desires, the control lever 68 is operated about the point 44 relative to the fixed member 46. In turn the segment 36 to which it is connected also pivots about the point 44. Pivoting of the segment 36 displaces the free pivot 48 at its other end thereby causing the second segment and its actuator 66a to move relatively to the trailing end 62 of the fixed member 46. Gear 66a thus moves about fixed gear 66b and as a consequence, moves the segment 38 relative to the first segment 36 along an arc. Similarly, the first segment 36, having its actuating spur gear 66e in engagement with the spur gear 66f of the third segment 40, causes the same to pivot and be displaced arcuately relatively to the second segment 38, while the pivot 50 of the second and third segments is displaced from its normal alignment with the fixed pivot 44.

This displacement and relative pivotal movement of segments is passed on down to the fourth segment 42 from the second segment 38 by way of the interconnecting actuators 66d and 66c respectively. To those who are skilled in the art it will be obvious that if any further segments were added in line beyond the fourth segment 42, substantially the same movement would occur if, of course, the alternate arrangement of actuators were continued. Hence the number of segments and actuators here disclosed are not to be deemed limiting of the invention.

As the segments are moved relatively to each other and their free pivots are displaced as a result of the operation of the control lever 68, they define a smooth curve of any selected degree of arc. The vent cover 74 thereof then uncovers the vents 78 to permit air or gases from the atmosphere to enter the deflector guideway and to co-mingle with the jet stream produced by the engine 30. The amount of air entering the jet stream by way of the vents 78 varies and corresponds to the controlled movement of the lever 68 as its vent cover 74 is lifted from the seat 76.

Air from the atmosphere co-mingling with the jet stream tends to cool the heated guiding surfaces of the deflector 34 and also serves to increase the density of the jet, to better its lift characteristics, while cooling the same. The infinite predetermined selective controlled movement of the segments of the deflector 34 permits the same to guide the jet produced by the engine 30 through a substantially smooth uninterrupted arc that normally passes through the plane of the center of gravity of the aircraft.

Any movement or displacement of the line of segments from their normal position in 0° alignment with the normal forward component of thrust of the jet, will produce a vertical component of thrust or lift on the aircraft in addition to the forward horizontal component of thrust. When, for example, the deflector is actuated from its normal position of 0° to an acute angle of approximately 45° of arc as indicated by the dot-dash lines in Fig. 2, the jet stream will be deflected to produce at least a vertical component of thrust that is substantially in alignment with the plane of the center of gravity of the aircraft, while, at the same time producing a forward horizontal component of thrust that will continue to propel the aircraft in a forward direction. The resulting component of thrust produces a lift on the aircraft that is created independently of the lift that normally occurs along the wings or other surfaces of the aircraft.

This vertical component of lift can be minutely varied by the operation of the control lever 68 and the responsive operation of the actuator means 66a to 66f inclusive. Hence, the jet produced by the engine 30 may be deflected from its normal forward thrust angle of 0° along a curve of an arc of 90°. In the perpendicular exhausting direction the jet thrust will then be exerting its full force substantially in alignment with the vertical plane of the center of gravity of the aircraft. As a consequence, it will be realized that if the thrust of the jet were normally sufficient to raise the aircraft, the 90° angle exhaust position of the deflected jet as shown in Fig. 1 would create a component of lift on the aircraft 20 sufficient to lift the same vertically since the normally total horizontal jet thrust is completely converted to lift.

Referring now to Figs. 10 and 11, wherein the embodiment of the deflector structure there shown is generally identified by the numeral 80. Deflector 80 is similar to the deflector 34 previously described in that it is comprised of a successive line of segments 136, 138, 140 and 142. The segments 136 to 142 are similar in structure to the segments 36 to 42 respectively of the deflector 34, and differ therefrom only in the actuator means that is employed to cause the segments and their interconnecting pivots 148, 150 and 152 to be displaced and move relatively to each other.

A control means or lever 168 is connected to the line of segments in the same manner as described in the deflector structure 34 and operates for the same purpose, that is, to displace at least one of the segments relative to the fixed pivot 144 whereby the remaining free pivots 148, 150 and 152 may be moved out of 0° alignment therewith, and whereby the successive segments will move relatively to each other and to their respective pivots to form a substantially smooth curve of an arc of any desired degree from 0° to at least 180°.

The actuating means in the instant embodiment 80 comprises a linkage system whereby the links interconnect alternate segments to each other for relative movement and displacement. As the description proceeds it will be recognized that the linkage system is another method other than the system of intermeshing gears 66a to 66f to perform the same function.

Operation of the control means or lever 168 by way of a pilot manipulated operating mechanism (not shown) connected thereto at 172 will pivot the first segment 136 about its fixed pivot 144 relatively to the fixed member 146. Accordingly, the free pivot 148 at the rear end of the first segment 136 will be displaced downwardly from its 0° alignment with the fixed pivot. This displacement of the pivot 148 will carry with it the second segment 136 and its attendant side 156.

The second segment 138 is interconnected with the fixed member 146 by an arm 166a extending in an elongated manner forwardly of its side 156 and connected by link 167a to a toe 169b of a bell crank lever 166b that is fixedly secured to the fixed member 146 in the area of the fixed pivot 144. Link 167a is pivoted at its upper end to the arm 166a, and at its lower end to the toe 169b. Hence, when the free pivot 148 is displaced by the downward movement of the first segment 136, the successive second segment 138 is caused to move about the pivot 148 relative to the first segment 136 as a result of the limited movement permitted by the actuating links 166a, 166b and the interconnecting link 167a.

As a result of the relative pivoting movement of the second segment 138 with respect to the first segment 136, its pivot 150 at the rear thereof is also displaced. The third segment 140 which is alternately positioned or once removed from the first segment 136, is then caused to move relatively to the second segment 138 about the free pivot 150, as a result of its actuating linking connection with the first segment 136. The first and third segments 136 and 138 are interconnected by a bell crank lever 166e that extends downwardly from its fixed mounting on segment 136 in the area of pivot 148.

The side 158 of the third segment 140 is provided with an arm 166f elongated in length and connected to the toe 169e of the bell crank lever 166e by an interconnecting link 167f which is pivoted at its top end to the end of the arm 166f and at its bottom end to the toe 169e. Hence, the movement of the third segment 140, when displaced by the pivotal movement of the second segment 138, is controlled in its pivoting movement by the actuating linkage structure interconnecting it with the alternate or first segment 136.

As the third segment 140 is pivoted relatively to the second segment 138 in the controlled manner mentioned above, it displaces the free pivot 152 at the rear thereof to thus displace the fourth segment 142. During this displacement, the fourth segment is caused as a result of the actuating linkage between it and the alternately or once removed second segment 138, to pivot about the pivot 152 relatively to the third segment 140. The pivoting results from a slide shoe and guide arrangement 169c and 167d.

The second and fourth segments 138 and 142 each have arms 166c and 166d respectively that extend in an elongated manner toward each other. The arm 166c is provided with an elongated slotted guide 169c facing the arm 166d, while the latter arm is provided with a slide shoe or pin 167d that is movable within the guide and pivoted in a controlled manner relatively thereto. Hence, when the pivot 152 is displaced as a result of the pivotal movement of the third segment 140, the slide shoe 167d moves within the guide 169c to cause its segment 142 to pivot about the free pivot 152 and to move relatively to the third segment 140. The result is a substantially smooth curve defined by the combination of displaced pivots and movable segments. It will be recognized that if desired the actuating combination of elements 166, 167 and 169 connected with their respective segments may be replaced by the shoe slide and guide arrangement described above. Such shoe slide and guide arrangement may therefore constitute another form of control means for the deflector.

As noted previously, the number of segments that is provided is not to be deemed limiting of the invention, since it is readily obvious that they may be increased in number to effect a smoother curve or a longer deflector, or both. The actuating structure here disclosed has been related to four segments only to provide a clear analysis of its operation. If the number of segments is to be increased or decreased, the actuating structure is likewise increased or decreased since its function will remain the same.

In the instant embodiment 80, as in the prior embodiment 34, the vents 178 will admit varied amounts of gases from the surrounding atmosphere to the jet stream. The cover 174 will be lifted out of its seat to a varying extent depending upon the degree of arc to which the deflector structure is actuated. Hence the amount of air vented into the jet stream and guideway of the deflector structure will correspond to the extent to which the same is operated.

It is important to note that in the description of the deflector structure 80 the actuator means for the segments is positioned all on one side surface thereof, whereas in the embodiment 34 the actuator means was described as being divided between the two spaced side surfaces. In actual practice the position of the actuator means depends upon the results to be accomplished. Hence it is within the teaching of the invention to arrange the actuator means so that they may be on just one side of the three-sided guideway as shown in the embodiment in Figs. 10 and 11, or they may be divided between both sides of the guideway as shown in the embodiment in Figs. 4 to 9, or they may be compounded so that each side may include a full set of actuating means.

Although the deflector structure 80 does not disclose details of the recessed and overlapped sides to provide a substantially smooth uninterrupted surface, this teaching should be obvious from the structure 34 and may be applied with equal facility to the instant embodiment.

From the foregoing it should be clear that the invention is applicable to control the exhaust angle of any jet, and is especially applicable to high speed jet-propelled aircraft without detriment to its high speed flight characteristics. The deflector structures smoothly and efficiently divert the jet stream from its normal horizontal thrust direction of 0° up to at least 180° without affecting the free passage and free flow of the jet from its engine and without in any way altering or changing the position of the engine with respect to the remaining structure of the aircraft. The invention contemplates a substantially smooth guideway aligned with the exhaust of the engine for normal high speed flight and a smooth guiding diversion of the direction of exhaust of the jet to attain predetermined desired changes in vertical lift and horizontal thrust flight characteristics.

It has been demonstrated in practice that the line of segments of the deflector structures may be controlled also to deflect the jet stream through an arc of at least 180° (Fig. 3) whereby the exhaust of the jet will be in the direction of forward movement of the aircraft. In that case the jet thrust serves as a braking force on the aircraft during landings. This would naturally permit short field landings. The 90° exhaust position of the jet as shown in Fig. 1 permits short field vertical take-offs and landings, while any one of the intermediate acute positions of the deflector as exemplified in Fig. 2, may also facilitate short field landings and take-offs.

By diverting the exhaust position of the jet from its normal 0° position and causing the same to pass through the center of gravity of the aircraft, there results a vertical component of lift on the aircraft produced by the deflective jet which component will be aligned substantially with the plane of the center of gravity of the aircraft. Thus, there may be produced on the aircraft in the area of the same (C.G.) where the weight thereof is concentrated most, a lift, the fullest component of which is used to the greatest possible extent.

With the engine and deflector structure located in regard to the remaining structure of the aircraft such that the created component of vertical thrust falls in substantial alignment with the center of gravity of the aircraft, it is necessary to stabilize the flight characteristics to prevent tendencies to "mush" or "fall-off" at zero or low horizontal forward speeds. Adequate horizontal trim is thus provided by auxiliary jet forces exerted at the extremities of the aircraft's center of gravity, as at 82 in Fig. 1.

The phrase "vertical component of lift," or like phrases have been employed to delineate the fact that there is a component of lift directed entirely in the vertical direction as distinguished from a component of thrust that includes and is a resultant of both vertical and horizontal thrust.

The embodiment of the deflector structure disclosed in Figs. 12 to 14 is generally identified by the numeral 234. Deflector structure 234 is substantially the same as the deflector structures 34 and 80 previously described. In the instant embodiment, the segments 236, 238, 240 and 242 may be actuated by any one of the aforementioned controls or any combination thereof.

From the drawings it will be noted that the deflector segments are double skinned to define hollowed interiors. The interior of each segment is aligned in communication with the interior of every other segment to define a communicating cooling duct. The first segment 236 is movable about the pivot 244 fixed in the stationary member 246 and extends normally therebeyond to position its hollowed interior into comunication with a fixed port or duct 278. The duct 278 is either fixedly mounted on or defined as a part of the stationary member 246.

Duct 278 is provided with an air intake scoop 276 that normally directs air thereinto and subsequently through the communicating aligned ducts of the deflector segments. Air passing between the double skinned deflector segments thus cools the interior surfaces of the same. The cooling air so ducted is caused to exhaust at the eductor 280 located within the inside of the deflector structure 234 to co-mingle the cooling air with the hot exhaust jet stream emitted by the engine 30.

Upon operation of control lever 268 the deflector structure 234 is caused to move from its 0° position of alignment with the exhaust jet stream of the engine 30. Movement of the first segment 236 about its pivot 244 positions its opening or scoop 276a out of alignment with the fixed duct 278. To those who are skilled in the art, it will be understood that the extent to which the scoop 276a is moved out of alignment with the scoop 278 depends, of course, upon the degree of arc that the deflector segments are caused to assume.

The result is a double scooping action. With deflector structure in its 90° position as shown in Fig. 13, the secondary scoop 276a will serve to communicate cooling air between the double skinned segments to exhaust the same within the deflector structure at the eductor 280. The fixed scoop 276 and its duct 278 emits or vents cooling air at 282 (Fig. 13) to directly mix with the hot jet gases. Air entering the deflector structure at 282 provides a cooling layer between the hot jet stream and the deflector surface skin of the segments, thereby resulting in an efficient cooling system while also densifying the jet stream and augmenting the thrust thereof.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In an aircraft driven by a jet produced by an engine situated thereon to create a substantially horizontal component of thrust for normal flight, a plurality of abutting relatively movable segments extending from the exhaust end of the aircraft engine at an angle of 0° in alignment with the component of forward thrust of the jet, said segments defining a substantially enclosed guideway for the jet, operative actuator means between said segments to cause the same to move relatively to each other to form a substantially smooth curved guideway of segments in abutting relationship for the jet to deflect the same from said angle of 0° and horizontal thrust to create a vertical component of thrust, and means to operate said actuator means to selectively vary the arc of said guideway to produce desired components of lift and thrust on the aircraft.

2. In an aircraft as in claim 1, said guideway extending through the plane of the center of gravity of the aircraft, and the component of lift created by the deflection of the jet being directed substantially in alignment with the plane of the center of gravity.

3. In an aircraft as in claim 1, said segments being operable by said actuator means to form a substantially smooth segmented curve of at least 180° and defining a smooth segmented curved deflecting guideway for the jet to direct the same in the direction of movement of the aircraft.

4. An aircraft comprising a jet producing engine, an operative deflector projecting from the exhaust end of said engine and forming an extension thereof to deflect the jet exhausted thereby, said deflector including a plurality of relatively unspaced segments each one of which is movable relatively to the next adjacent segment, actuator means interconnected between said segments and selectively operable to move the same relatively to each other, and said segments cooperating with each other to define a guideway of relatively unspaced segments for the jet to variably deflect the same through an arc of any desired angle of exhaust between 0° and 180° without substantially affecting the exhaust area of the engine in response to the selective operation of said actuator means, the curvature formed by the segments of said guideway being uninterrupted and substantially smooth.

5. An aircraft as in claim 4, said sides of said guideway each including said actuator means.

6. An aircraft as in claim 4, sides of said guideway being formed as parts of said segments and cooperatively movable relatively to each other with the movement of their respective segments in response to the operation of said actuator means to define the substantially smooth and uninterrupted segmented guideway.

7. In an aircraft having a jet propulsion, a deflector therefor comprising a plurality of segments each one of which is in abutting alignment with and movable relatively to the other, each abutting segment having a side extending downwardly therefrom, said abutting segments cooperating with each other to define the top and said sides cooperating with each other to define the sides of a guideway for the jet, said sides each being smooth and overlying portions of the next adjacent sides for cooperative movement therewith to define substantially uninterrupted side surfaces, and actuator means on each of said segments interconnecting adjacent segments to move the same relatively to each other.

8. In an aircraft as in claim 7, and said actuator means including meshing spur gears.

9. In an aircraft as in claim 7, said actuator means including a linkage system.

10. In a deflector for the jet of an aircraft, at least three relatively movable segments extending rearwardly of an engine producing the jet, the second of said segments being movably connected to and for continuous abutting arcuate movement between the first and third segments, the first of said segments having a fixed pivot, operable actuator means between said first and third segments to move the latter in response to movement of the former, and means to move said first segment about said fixed pivot.

11. In a deflector as in claim 10, and actuator means between said second segment and said fixed pivot to move said second segment in response to movement of said first segment.

12. In a deflector as in claim 11, a fourth segment movably connected in abutment with said third segment, and actuator means between said second and fourth segments to move the latter relatively to said third segment in response to movement of said second segment.

13. In a deflector as in claim 12, said actuator means between said segments being intermeshing gears.

14. In a deflector as in claim 12, said actuator means between said segments including a system of interconnecting links.

15. In a deflector as in claim 10, a fixed surface including said fixed pivot, ports defined in said fixed surface and cover means on said actuator means exposing said ports during predetermined operation of said actuator means to move said first segment.

16. In a deflector for the jet produced by an aircraft engine, a fixed member extending from the exhaust of the engine, a plurality of abutting segments extending successively from said fixed member, said succession of segments being pivoted at one end to said fixed member and each of said segments being freely pivoted to the next adjacent successive abutting segment for movement relatively thereto, actuator means interconnecting alternate ones of said segments and the second of said segments with said fixed member, and means connected with said segments to displace said free pivots and to operate said actuator means to move said segments in abutment relative to each other.

17. In a deflector as in claim 16, said actuator means including gears.

18. In a deflector as in claim 16, said actuator means including a system of links.

19. An aircraft comprising an engine producing a jet, a deflector in normal alignment with the exhaust of the jet and operable to deflect the same from its normal angle of exhaust through a desired angle of at least 90°, said deflector including a member fixed to the exhaust end of the engine, a line of segments and pivots arranged in closed relationship, the first of said line of segments being pivoted to said fixed member, successive ones of said segments being pivoted to adjacent segments of said line, actuator means connecting alternate ones of said segments and the second segment in said line with said member, and control means cooperative with at least one of said segments to cause the same to pivot from its normal alignment and to cause the said line of segments and their pivots arranged in closed relationship to assume desired uninterrupted arc of at least 90° through which the jet is deflected.

20. An aircraft as in claim 19, said deflector passing the plane of the center of gravity of the aircraft and said deflected jet being deflected through the plane of the center of gravity of the aircraft to create a component of lift in substantial alignment with the plane of the center of gravity of the aircraft.

21. An aircraft as in claim 19, vents in said member, means operable in response to the deflecting operation of said control means to expose said vents to the atmosphere, said vents communicating with the arc formed by the deflector to admit atmospheric air thereto.

22. An aircraft comprising an engine producing a jet thrust to propel the same, a jet deflector situated in the vertical plane of the center of gravity of the aircraft forming an uninterrupted extension of and from the jet exhaust end of said engine to deflect the jet exhausted thereby along a smooth segmented curve from an angle of 0° to at least 180°, said deflector including a plurality of segments each one pivoted in abutting relationship to the next adjacent segment to form said uninterrupted extension, said pivoted abutting segments each including a top and at least a side wall extending downwardly from a side thereof, said side walls and top being substantially smooth to define a three-surface guideway between which the jet is guided, said segments each including an actuator means cooperable with the actuator means of the next adjacent side wall, and each actuator means being relatively movable to effect pivoting abutting movement of the segments relative to each other, vent means defined in said deflector and operative to combine atmospheric air with the jet when said deflector is actuated from its angle of 0°, and means connected with said deflector to actuate the same between said angle of 0° and 180° by causing each of said actuator means to move relative to each other and to render said vent means operative and inoperative.

23. The method of utilizing the thrust of the jet of an aircraft comprising variably guiding the jet through an arc of between 0° and 90° from its normal exhaust location to create variable vertical components of lift and horizontal thrust, to vary the forward thrust and vertical lift characteristics of the jet, guiding the jet through an arc that is substantially perpendicular to the normal flight attitude of the aircraft and in a plane that is substantially in alignment with the center of gravity of the aircraft to direct the maximum thrust of the jet for vertical lift, and guiding the jet through an arc of between 90° and 180° from its normal exhaust position to direct its thrust in the direction of forward movement of the aircraft to exert a braking thrust on the aircraft.

24. In an aircraft having a jet produced by an engine, a deflector therefor comprising a plurality of abutting relatively movable segments having deflector surfaces in 0° alignment with the jet, operable means cooperating with said abutting segments to move the same from their alignment to abuttingly deflect the jet, and vent means included in said deflector to vent atmospheric air into communication with the deflector surfaces of said abutting segments.

25. A jet deflector as in claim 24, said segments each having interior communicating ducts, said vent means communicating with said ducts to vent atmospheric air thereto when said segments are aligned, and said vent means communicating with said surfaces when said segments are moved to deflect the jet.

26. A jet deflector as in claim 24, said vent means being fixed on said deflector, said segments each having communicating ducts therein, said vent means communicating with said ducts to vent atmospheric air thereto when the segments are in said alignment with the jet and variably communicating with said deflector surfaces and said ducts when said segments are moved to deflect the jet.

References Cited in the file of this patent

UNITED STATES PATENTS

| | | |
|---|---|---|
| 2,041,688 | Barnhart | May 26, 1936 |
| 2,404,956 | Gouge | July 30, 1946 |
| 2,420,323 | Meyer et al. | May 13, 1947 |
| 2,734,698 | Straayer | Feb. 14, 1956 |
| 2,759,686 | Griffith | Aug. 21, 1956 |
| 2,761,634 | Valazquez | Sept. 4, 1956 |
| 2,774,554 | Ashwood et al. | Dec. 18, 1956 |

OTHER REFERENCES

Aviation Week, October 24, 1955, pp. 38 and 39.